United States Patent [19]
Saotome et al.

[11] Patent Number: 4,851,731
[45] Date of Patent: Jul. 25, 1989

[54] STRUCTURE OF A FLAT-TYPE BRUSHLESS DC MOTOR

[75] Inventors: Toshio Saotome, Tokyo; Yoshiyuki Noguchi, Kanagawa; Mitsuo Nishikawa, Kanagawa; Shigeki Yamazaki, Kanagawa, all of Japan

[73] Assignee: Sony Corporation, Tokyo, Japan

[21] Appl. No.: 165,919

[22] Filed: Mar. 10, 1988

[30] Foreign Application Priority Data

Mar. 11, 1987 [JP] Japan .................. 62-055968

[51] Int. Cl.$^4$ ........................... H02K 1/12
[52] U.S. Cl. ...................... 310/258; 310/51; 310/90; 310/156; 310/268
[58] Field of Search ........... 310/258, 254, 268, 177, 310/51, 156, 90, 89, DIG. 6, 179, 180, 46; 318/128

[56] References Cited

U.S. PATENT DOCUMENTS

| | | | |
|---|---|---|---|
| Re. 26,749 | 1/1970 | Montagu | 335/229 |
| 3,624,574 | 11/1971 | Montagu | 335/279 |
| 4,135,119 | 1/1979 | Brosens | 318/128 |
| 4,181,867 | 1/1980 | Muller | 310/268 |
| 4,647,803 | 3/1987 | von der Heide | 310/90 |
| 4,755,698 | 7/1988 | Frister | 310/51 |
| 4,757,222 | 7/1988 | Shiraki | 310/DIG. 6 |

FOREIGN PATENT DOCUMENTS

| | | | |
|---|---|---|---|
| 0013906 | 2/1979 | Japan | 310/51 |
| 0037048 | 2/1987 | Japan | 310/51 |
| 562307 | 6/1944 | United Kingdom . | |
| 2185640 | 7/1987 | United Kingdom . | |
| 2187045 | 8/1987 | United Kingdom . | |
| 2190153 | 11/1987 | United Kingdom . | |

Primary Examiner—R. Skudy
Attorney, Agent, or Firm—Lewis H. Eslinger; Jay H. Maioli

[57] ABSTRACT

A flat type DC motor applicable for disc drive of an electronic still camera in which vibrations of the rotor axle are prevented without increasing manufacturing costs by providing the magnetic field between the stator and rotor to by asymmetrical so that the magnetic attracting force of the rotor to the stator is also asymmetrical. The asymmetrical attracting force causes the axle of the rotor to be urged in the same radial direction relative to the axle bearing in the stator, thus, movements of the axle in radial directions in the clearance between the axle and bearing of the stator are eliminated and the rotor rotates without vibrating.

3 Claims, 4 Drawing Sheets

STRUCTURE OF A FLAT-TYPE BRUSHLESS DC MOTOR

BACKGROUND OF THE INVENTION

1. Field of the Invention

This invention relates generally to the structure of a flat-type brushless DC motor and, more particularly, to such motor in which a side force is continuously applied to the rotor to prevent epicyclic motion of the rotor shaft or axle.

2. Description of the Background

Flat, thin, brushless DC motors, so-called spindle motors, have generally been known for use in various applications and one particular use is for the disc drive section of an electronic still camera. Such brushless DC motors are generally known to include a rotor and a stator, which rotatably supports the rotor.

In such flat, brushless, DC motors the rotor typically includes a dish-shaped rotor yoke with a rotary axle projecting downwardly to the center and a circular chucking magnet affixed to an internal peripheral surface of an annular rib that integrally projects upwardly from an upper surface of the rotor yoke. The chucking magnet holds the magnetic disc for recording. A disc-shaped circular rotor magnet is affixed to a lower surface of the rotor yoke by means of disc-shaped circular auxiliary yoke.

The stator of such brushless DC motor typically includes a disc-shaped stator yoke and a boss formed in the center thereof to which is affixed an oil-containing, cylindrically shaped, metal bearing that is staked into an open center portion of the stator yoke. The oil-filled metal bearing is provided to support the axle of the rotor and at the lowermost end where it is affixed to the boss a disc-shaped thrust bearing is provided as an axial bearing support for the rotor axle. A flexible printed circuit board has formed thereon a six-phase sheet-like coil, which is radially disposed with the boss as a center and is spaced apart from the rotor magnet with a predetermined clearance. The printed circuit board is affixed to the flat surface of the stator yoke that is facing the rotor magnet.

In the operation of such brushless DC motors, when a current flows into the sheet-like coil of the stator yoke thereby magnetizing the sheet-like coil, the coil is attracted to a magnetic pole of the rotor magnet so as to produce a rotary force to drive the motor. Thus, the rotor is rotated in a predetermined direction with the rotor axis as a center. The magnetic disc of the electronic still camera is caused to rotate with the rotation of the rotor by being attracted to the chucking magnet that is mounted on the upper or outer surface of the rotor.

As in all consumer products the cost of manufacturing the product is extremely important and in the brushless motor used in the disc drive section of the electronic still camera the cylindrically shaped, oil-containing metal bearing is employed s a substitute for a much more expensive ball bearing. It is known that in the use of such oil-filled bearings some clearance must be provided between the rotary axle or shaft and the metal bearing and further such clearance is generally emphasized by the difference between expansion coefficients of the bearing material and the material of the axle of the rotor, that is, there is a measurable difference in the temperature response characteristics of the respective two metals. Thus, it is seen that because of this clearance, which may vary in response to temperature, it is impossible to avoid vibrations of the axle relative to the bearing caused by such clearance, unless a side force is continuously applied to the axle to cause it to remain in the same place relative to the bearing. Furthermore, over the life of such brushless DC motor wear will occur between the axle and the bearing caused by friction and, thus, the clearance initially provided between the axle and the bearing will increase. This further provides and opportunity for non-periodic vibrations of the axle which cannot easily be eliminated by realignment and further a generally periodic axle vibration may also easily occur with such increase in clearance between the bearing and axle.

Therefore, in view of such motor vibrations, if a brushless DC motor having vibrations in the rotor axle is used as the rotary drive for a high density magnetic disc, as might be used in an electronic still camera, whose track width is narrow, severe problems occur during recording on such magnetic discs.

One example of a brushless DC motor attempts to prevent vibrations of the rotor axle by providing a unidirectional thrust to the rotor In that spindle motor, an additional magnet is installed between the axle and the stator magnet so that a side force is continuously applied to the rotor axle in a lateral direction by the magnetic attracting force of the magnet on the axle. In this fashion, the axle is attracted toward the particular side of the bearing on which the additional magnet is located, thereby preventing periodic and/or non-periodic vibrations on the rotor axle.

Nevertheless, as pointed out about because the very reason for using the oil-filled bearing in the first place is to effect a cost saving, it has been found that by providing the additional magnet to overcome the rotor axle vibration problems that this additional magnet requires additional installation time, as well as increasing the number of assembled parts in the motor and increasing labor cost and the construction of the motor becomes unduly complex. Consequently, manufacturng costs of the whole motor are increased. Furthermore, because the spindle motor is intended to be a substantially small-sized motor, there is not sufficient space in a flat, brushless, DC spindle motor to accommodate a strong permanent magnet that is capble of providing a sufficiently strong side pressure to the axle that can meet the requirement for reduced rotor axle vibration.

OBJECTS AND SUMMARY OF THE INVENTION

Accordingly, it is an object of the present invention to provide a flat brushless DC motor that can eliminate the above-noted defects inherent in such motors known heretofore.

Another object of this invention is to provide a flat, brushless DC motor in which rotor axle vibrations can be eliminated in a fashion that does not substantially increase the cost of such motor.

In accordance with an aspect of the present invention, the above objects can be achieved by providing a brushless DC motor including stator yoke, on which a plurality of stator windings are formed and a metal oil-filled bearing rigidly coupled to the stator yoke. The rotor has a circular magnet affixed to the rotor axle that is in turn rotatably supported by the metal bearing of the stator yoke. According to the present invention, the stator yoke is then arranged to be magntically asymmetrical relative to the rotor magnet, thereby providing a lateral or radial force that is uni-directionally exerted on the axle relative to the metal bearing to prevent unwanted vibrations.

The above and other objects, features and advantages of the present invention will become apparent from the following detailed description of illustrative embodiments thereof, to be read in conjunction with the accompanying drawings in which like reference numerals represent the same or similar elements.

DETAILED DESCRIPTION OF PREFERRED EMBODIMENTS

Figure 1:
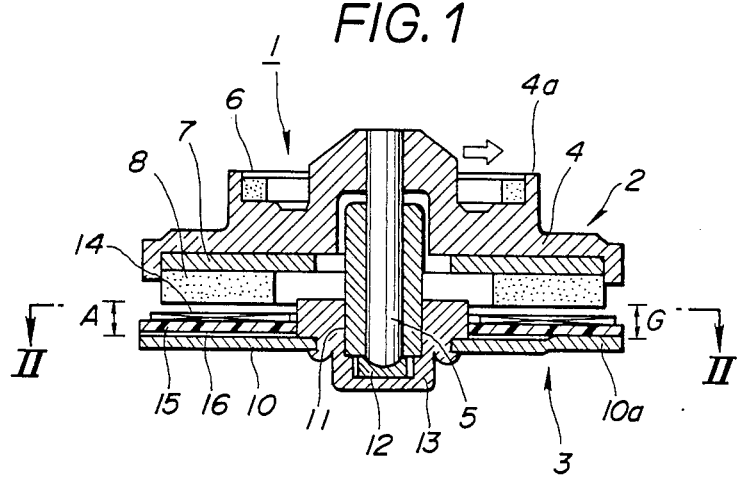
FIG. 1 is an elevational view in cross section of a first preferred embodiment of a brushless DC motor according to the present invention.

FIG. 1 shows a brushless DC motor 1 according to a first preferred embodiment of the present invention in cross section, with such brushless DC motor being specifically applicable for use in the disc drive section of an electronic still camera. This brushless DC motor includes generally the elements known for use in such motor, specifically, a rotor 2, a rotor yoke 4, an axle 5 fixed to the center of rotor yoke 4 an annular rib 4a, a chucking magnet 6, an auxiliary rotor yoke 7, and a disc-shaped circular rotor magnet 8. As shown in FIG. 1, rotor yoke 2 is generally of a circular dish-shape that is downwardly facing relative to axle 5, which projects vertically in the downward direction from the center of rotor yoke 2. Rotor magnet 8 is affixed to a lower, flat surface of rotor yoke 4 by use of disc-shaped auxiliary yoke 7. Motor 1 also includes, of course, a stator 3 that comprises a disc-shaped stator yoke 10 and a boss 13 that is staked or otherwise firmly affixed to the center of stator yoke 10. Boss 13 supports an oil-filled metal bearing 11 that in turn rotatably supports axle 5 of rotor 2 in the radial direction. A flexible printed circuit board 15 has a six-phase sheet-like coil 14 radially arranged thereon, with boss 13 as a center, and is affixed to a flat surface of stator yoke 10 that opposes or faces rotor magnet 8. The magnetic poles N, S of rotor magnet 8 are alternatingly arranged in the embodiment of FIG. 1.

Figure 2:
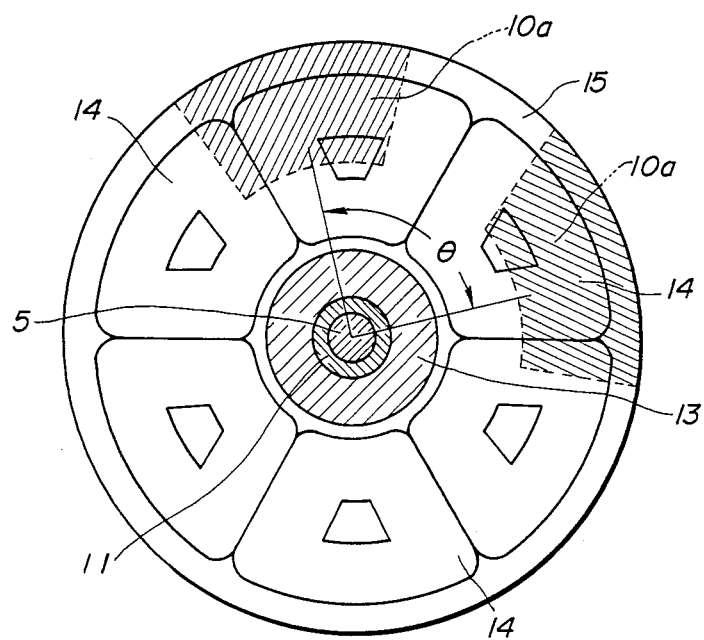
FIG. 2 is a cross-sectional view of the brushless motor of FIG. 1 taken along section line II—II.

According to the present invention, a uni-directional sideways or lateral thrust is applied by providing a pair of stepped portions 10a formed on rotor yoke 10, which stepped portions are facing the rotor and, thus, project an bend flexible printed circuit board 15 and the flat stator coils toward the rotor. Stepped portions 10a are shown more clearly in FIG. 2 and, as seen therein, the upper surfaces of the pair of stepped portion 10a are formed with their centers separated from one another by a 90° electrical angle $\theta$, in order to prevent cogging of the motor. In addition, at locations other than the stepped portions 10a on stator yoke 10, flexible printed circuit board 15 and stator yoke 10 are attached together by means of a sheet-like adhesive layer 16.

Referring back to FIG. 1, as a result of stepped portions 10a, a gap A between a left-side of rotor magnet 8 and stator yoke 10 will be greater than a diametrically opposed gap G between a right-side of rotor magnet 8 and stator yoke 10, when viewed relative to the elevation of FIG. 1. The difference between the respective distances of gaps A and G is the extent of the height of the step portion 10a. Furthrmore, because gaps A and G are asymmetrical in the right and left directions the magnetic attracting force between the rotor and stator is unbalanced.

In this first embodiment, because the pair of stepped portions 10a on stator yoke 10 of stator 3 project toward the sheet-like coil 14, the unbalance in the magnetic attracting force of rotor magnet 8 of rotor 2 relative to stator yoke 10 is generated when rotor 2 is caused to rotate. Because rotor magnet 8 will also be attracted to stepped portion 10a of stator yoke 10, the entire axle 5 of rotor 2 is also attracted in a single direction, as represented by the arrow in FIG. 1. That is, the arrow points in a radial direction relative to bearing 11 mounted in stator 3 and by means of this uni-directional force the rotor also rotates under the influence of a sideways or lateral force and axle 5 is always held against the same side of bearing 11.

Therefore, because of the side forces applied to axle 5 of rotor 2 of brushless motor 1 vibrations due to excess play in the radial direction of axle 5 relative to bearing 11 are eliminated during rotation of rotor 2.

Because the pair of stepped portions 10a project toward rotor magnet 8 and unbalance the magnetic forces relative to the rotor and the stator, the additional attracting magnet previously proposed to eliminate the vibrations is not required and the number of parts and labor costs are not increased. Thus, the entire construction of the spindle motor maintains its general simplicity and the manufacturing cost of the motor is not increased, yet the desired result of eliminating the rotor vibration is accomplished.

It will be appreciated from examining FIG. 1 that according to this embodiment of the present invention the magnitude of the side or lateral forces exerted on the axle of the rotor can be varied in accordance with the height and area of the stepped portions 10a on stator yoke 10. Thus, the extent of the force is directly controllable in a fashion that does not require any additional parts or labor.

Figure 3:
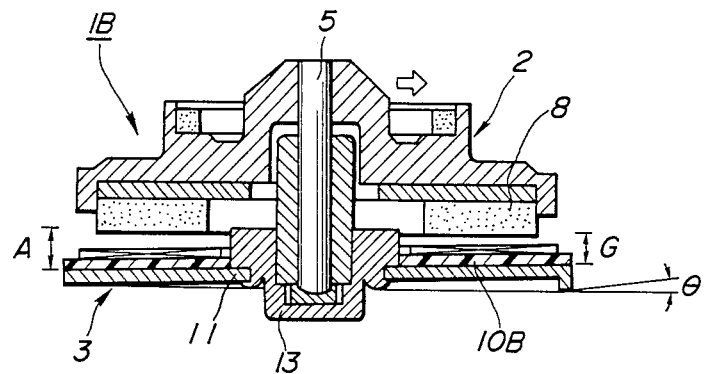
FIG. 3 is an elevational view in cross section of a second preferred embodiment of a brushless DC motor according to the present invention.

A second embodiment of the present invention is shown in the form of a brushless DC motor 1B in FIG. 3, in which boss 13 is affixed in a disc-shaped stator yoke 10B formed having an inclined upper or inner surface, which is inclined at an angle $\theta$ with respect to axle 5 in bearing 11. As in the embodiment of FIG. 1, this inclined surface of the stator yoke 10B is intended to provide an unbalanced magnetic force between stator coils and the rotor magnet by reducing the distance between these two elements at only a limited sector of the stator. More specifically, the inclination or slanted surface of stator yoke 10B causes gap A formed between the left side of rotor magnet 8 and stator yoke 10B to be greater than gap G formed between the right side of rotor magnet 8 and stator yoke 10B, as viewed in FIG. 3. This difference in gap dimensions results in an asymmetrical magnetic attraction in the horizontal direction relative to FIG. 3. As in the embodiment of FIG. 1, this attraction creates a uni-directional lateral force on the axle 5 of the rotor, which keeps the axle against one side of the bearing and tends to prevent vibrations of the rotor during rotation.

Figure 4:
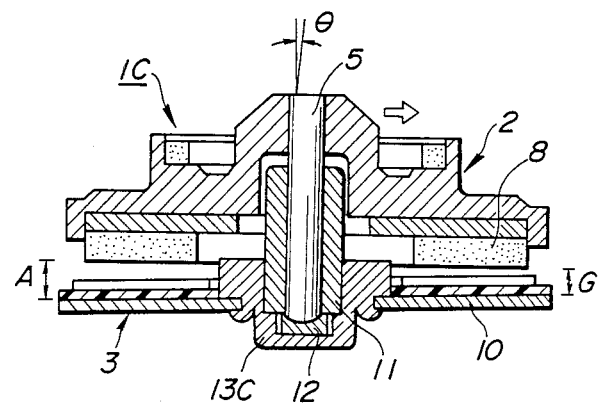
FIG. 4 is an elevational view in cross section of a third preferred embodiment of a brushless DC motor according to the present invention.

A third embodiment of the present invention is shown in FIG. 4 in which axle 5 of rotor 2 of brushless motor IC is rotatably supported in bearing 11 that is mounted in a boss 13C. Boss 13C is formed so that when it is staked in the central opening of stator yoke 10, boss 13C bearing 11, which receives axle 5 of rotor 2, will be inclined through an angle $\theta$ with respect to the vertical or axle direction of the motor 1C. Thus, upon insertion of axle 5 into the inclined bearing 11, the slight inclination of axle 5 will cause gap A that exists between the left-side of rotor magnet 8 and stator yoke 10 to be greater than gap G that exists between the right side of rotor magnet 8 and stator yoke 10, when viewed in the elevation of FIG. 4.

Therefore, the entire axle 5 is attracted in the direction shown by the arrow in FIG. 4, which represents the direction of the side force or uni-directional pressure that keeps that axle against one side of the bearing. This sideways force keeps the rotor in the bearing from vibrating as in the previously described embodiments.

Figure 5:
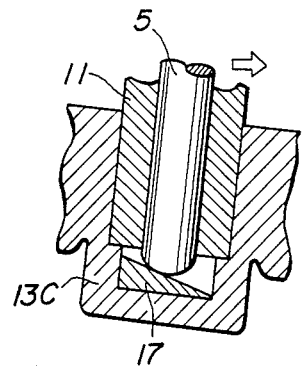
FIG. 5 is a partial view of the rotor axle and thrust bearing in partial cross section showing a preferred embodiment of a modification of the thrust bearing according to the present invention.
Figure 6:
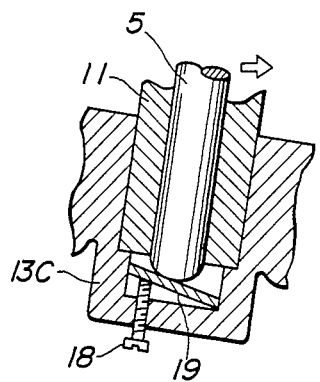
FIG. 6 is a partial view of the rotor axle and thrust bearing in partial cross section showing a second preferred embodiment of a modification of the thrust bearing according to the present invention.

The embodiments described heretofore have provided a difference in dimensions between gap A nd G by altering the stator yoke or the boss, however, FIGS. 5 and 6 disclose another embodiment of the present invention in which asymmetric magnetic attraction is provided by altering the dimensions of the axial thrust bearing 12 of FIG. 1. More specifically, in FIG. 5 thrust bearing 17 has a triangularly shaped cross section so s to create a slight tilt to axle 5 in bearing 11 and thereby provide a sideways operating force shown by the arrow in FIG. 5, so that the axle always resides against the same side of the bearing. This tilt results in the difference in the distances of gaps G and A.

In FIG. 6, a thrust bearing 19 is provided as a disc-shaped element whose angle of inclination relative to the stator plate 10, not shown in FIG. 6, can be varied by means of an adjustment screw 18. Therefore, by operating adjustment screw 18, the angle of inclination of axle 5 relative to bearing 11 can be permanent displaced by through an angle $\theta$ as in the embodiment of FIG. 4, for example, and the sideways operating force will be in a constant directon as represented by the arrow in FIG. 6.

Figure 7:
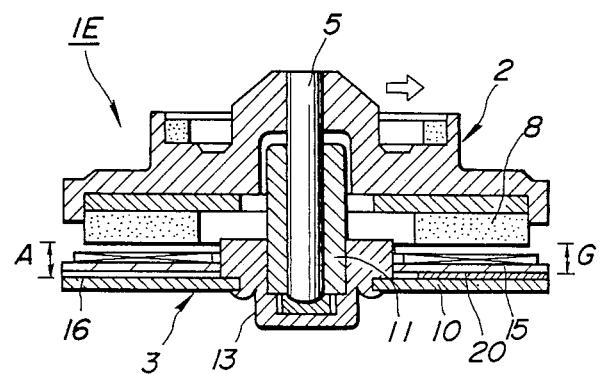
FIG. 7 is an elevational view in cross section of a fourth preferred embodiment of a brushless DC motor according to the present invention.

A fourth preferred embodiment of the present invention in the form of brushless DC motor 1E is shown in FIG. 7, in which an auxiliary stator yoke 20 is provided in the form of a magnetic attracting plate that is disposed between stator yoke 10 and flexible printed circuit board 15. This magnetic attracting plate in auxiliary stator yoke 20 covers a surface of stator yoke 10 that corresponds to the respective areas of the stepped portions 10a shown in FIG. 2, for example. At the other locations between stator yoke 10 and flexible printed circuit board 15, adhesive layer 16 is disposed just as in the embodiment of FIG. 1. Therefore, when rotor 2 is caused to rotate, a sideways force is applied to axle 5 of rotor 2 due to the increased magnetic force provided by rotor magnet 8 and auxiliary yoke 20. This asymmetric force then provides a lateral pressure against the axle 5 as represented by the arrow in FIG. 7. In this embodiment, the extent of the lateral force of axle 5 can be adjusted by varying the area of auxiliary stator yoke 20.

Figure 8:
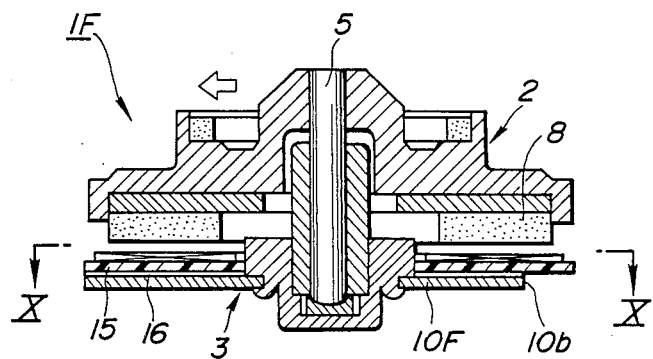
FIG. 8 is an elevational view in cross section of a fifth preferred embodiment of a brushless DC motor according to the present invention.
Figure 9:
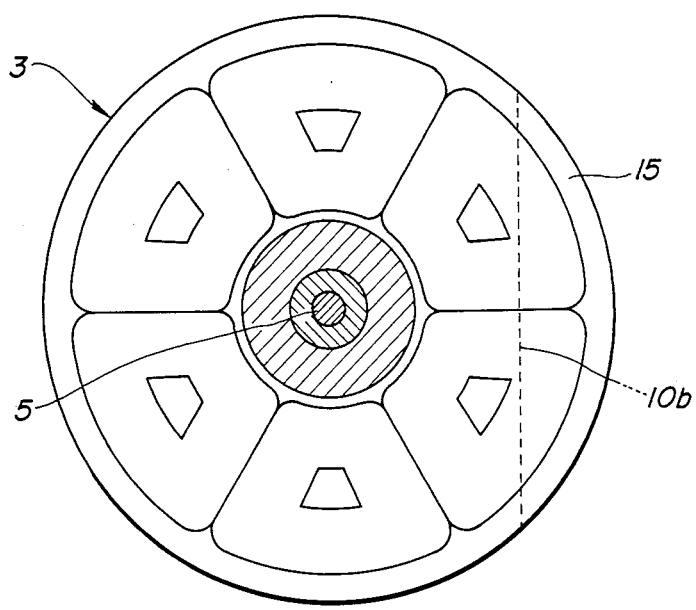
FIG. 9 is a cross-sectional view of the brushless DC motor of FIG. 8 taken long section line IX—IX.

A sixth embodiment of the present invention in the form of a brushless DC motor 1F is shown in FIGS. 8 and 9, in which a stator yoke 10F of stator 3 of the brushless motor 1F has a portion cut-away or remove at one side. This is represented by the chordal line 10b in FIG. 9, which is a cross-sectional view of the embodiment of FIG. 8, taken along section lines IX—IX. In this embodiment, of course, adhesive layer 16 is only provided at the area of contact between stator yoke 10F and flexible printed circuit board 15. By reducing the actual extent of metal forming the stator yoke relative to rotor magnet 8 of rotor 2, the magnetic attracting force therebetween becomes unbalanced in a left-right or diametrical fashion. Thus, when rotor 2 is rotated a sideways force or pressure is applied to axle 5 of rotor 2 in the direction shown by the arrow in FIG. 8. Accordingly, the axle is always held against the same side of the bearing by this uni-directional sideways force and the vibrations of the rotor are prevented during rotation.

Although in the above description, the motor embodying the present invention has been described as being brushless DC motor, the principle of the present invention can also apply to a brush equipped motor in which a coil is rotated. As seen from the preceding, in a spindle motor according to the present invention, the magnetic field between the stator and the rotor is controlled in such as manner that the rotor is attracted most strongly to the stator in one particular direction that is defined as a specific area of the stator. Therefore, a motor structure according to the present invention can prevent the occurrence of rotor vibration due to play in the radial direction that is a result of the clearance between the axle of the rotor an the bearing of the stator.

The above description is given on a single preferred embodiment of the invention, but it will be apparent that many modifications and variations could be effectd by one skill in the art without departing from the spirit or scope of the novel concepts of the invention, which should be determined only by the appended claims.

What is claimed is:

1. A brushless DC motor, comprising:
   a stator having a stator yoke on which a plurality of stator windings are arranged;
   a metal bearing rigidly coupled to said stator yoke;
   a rotor having a circular magnet fixed to a rotor axle which is rotatably supported by said metal bearing;
   wherein said stator includes a step portion formed on said stator yoke for causing magnetic asymmetry between said stator and said circular magnet, thereby to cause a lateral force to be exerted by said rotor axle on said metal bearing.

2. A flat DC motor structure, comprising:
   (a) a rotor having a circular magnet fixed to a rotor axle;
   (b) a bearing rigidly coupled to a stator yoke;
   (c) a stator mounting the stator yoke on which a plurality of stator windings are arranged; and (d) a stepped portion formed on said stator yoke thereby causing said circular magnet to be closer at a selected location to said stator windings for producing a magnetikc asymmetry between said circular magnet and said stator windings, so that a lateral force is generated and the rotor axle is magnetically urged in a lateral direction relative to said rotor axle.

3. A flat spindle motor structure, comprising:
a rotor having a circular magnet fixed to a rotor axle;
a bearing rigidly coupled to a stator yoke;
a stator for mounting the stator yoke on which a plurlity of stator windings are arranged;
said stator including a stepped portion formed on said stator yoke for for causing said stator yoke and said circular magnet affixed to said rotor axle to be magnetically asymmetrical, so as to cause said circular magnet of said rotor to be more attracted to one side of said stator yoke than to another side, so that said axle of said rotor is magnetically urged in a radial direction relative to said bearing.

* * * * *